US010947777B2

(12) United States Patent
Hall et al.

(10) Patent No.: US 10,947,777 B2
(45) Date of Patent: Mar. 16, 2021

(54) CUSTOMIZABLE GLASS WALL SYSTEM WITH PARTITIONED FILM (71) Applicants: David R. Hall, Provo, UT (US); Andrew Priddis, Mapleton, UT (US); Sigmar Tobias, Orem, UT (US); Thomas Tolman, Livingston, TX (US); Benjamin Taylor, Provo, UT (US); Dylan Astle, Provo, UT (US); Grant Getts, Provo, UT (US)

(72) Inventors: David R. Hall, Provo, UT (US); Andrew Priddis, Mapleton, UT (US); Sigmar Tobias, Orem, UT (US); Thomas Tolman, Livingston, TX (US); Benjamin Taylor, Provo, UT (US); Dylan Astle, Provo, UT (US); Grant Getts, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/383,500

(22) Filed: Dec. 19, 2016

(65) Prior Publication Data
US 2018/0171702 A1 Jun. 21, 2018

(51) Int. Cl.
E06B 9/264 (2006.01)
E06B 3/66 (2006.01)
(Continued)

(52) U.S. Cl.
CPC .............. *E06B 9/264* (2013.01); *E06B 3/6612* (2013.01); *E06B 3/677* (2013.01); *E06B 3/6707* (2013.01);
(Continued)

(58) Field of Classification Search
CPC .............. E06B 9/264; E06B 2009/2643; E06B 3/6722; E06B 9/40; E06B 9/72;
(Continued)

(56) References Cited

U.S. PATENT DOCUMENTS 3,186,473 A * 6/1965 Myers ..................... A47H 23/06
160/241
5,205,334 A * 4/1993 Judkins .............. B23Q 3/15526
160/108
(Continued)

OTHER PUBLICATIONS

Insulated Glazing, available Oct. 19, 2016, accessed Jan. 30, 2018 from https://en.wikipedia.org/wiki/Insulated_glazing.*

*Primary Examiner* — Johnnie A. Shablack
*Assistant Examiner* — Jeremy C Ramsey (57) ABSTRACT A customizable glass wall system is disclosed. The system comprises at least two glazed, transparent panes mounted to a frame, creating an internal space less than approximately five inches thick. At least one upper roller is mounted to an upper portion of the frame, preferably on a removable headboard, and at least one lower roller is mounted to a lower portion of the frame, preferably to a removable tailboard. At least one partitioned film is attached to the upper and lower rollers. The partitioned film has partitions with varied properties and functions, ranging from thermal insulation to decoration, which can be selectively positioned behind the transparent panes by rotating the partitioned film by means of the rollers until a selected partition of film is displayed. The system can be automated based on time, weather, amount of sunlight, or user preference, and it may include window coverings or solar cells.

20 Claims, 9 Drawing Sheets (51) Int. Cl.

| | |
|---|---|
| *E06B 3/677* | (2006.01) |
| *E06B 3/67* | (2006.01) |
| *E06B 5/10* | (2006.01) |
| *E06B 5/18* | (2006.01) |
| *E06B 9/40* | (2006.01) |
| *H02S 20/26* | (2014.01) |
| *E06B 9/42* | (2006.01) |
| *E06B 9/72* | (2006.01) |
| *E06B 9/24* | (2006.01) |

(52) U.S. Cl.
CPC ............ *E06B 3/6722* (2013.01); *E06B 5/106* (2013.01); *E06B 5/18* (2013.01); *E06B 9/40* (2013.01); *E06B 9/42* (2013.01); *E06B 9/72* (2013.01); *H02S 20/26* (2014.12); *E06B 2009/2452* (2013.01); *E06B 2009/2476* (2013.01); *E06B 2009/2643* (2013.01); *Y02B 10/10* (2013.01)

(58) Field of Classification Search
CPC ........ E06B 9/42; E06B 3/6612; E06B 3/6707; E06B 3/66; E06B 3/67; E06B 3/6715; E06B 2009/405

USPC .......................... 160/108, 241, 23.1, 25, 239
See application file for complete search history.

(56) References Cited

U.S. PATENT DOCUMENTS

| | | | | |
|---|---|---|---|---|
| 5,467,266 | A * | 11/1995 | Jacobs | .................. B60J 1/2016 160/1 |
| 5,735,328 | A * | 4/1998 | Salhoff | ..................... E06B 9/24 160/120 |
| 6,712,115 | B2 * | 3/2004 | Judkins | .................. E06B 9/264 160/178.1 R |
| 9,657,510 | B2 * | 5/2017 | Lu | ........................... E05D 15/08 |
| 2005/0287295 | A1 * | 12/2005 | Papp | ..................... C23C 14/044 427/248.1 |
| 2007/0068635 | A1 * | 3/2007 | Nicolosi | ................. E06B 9/264 160/98 |
| 2008/0053628 | A1 * | 3/2008 | Anderson | ............... E06B 9/264 160/238 |
| 2010/0307698 | A1 * | 12/2010 | Perkowitz | ................ A47H 2/00 160/108 |
| 2012/0168095 | A1 * | 7/2012 | Augustyniak | ........... E06B 9/262 160/84.05 |

* cited by examiner

CUSTOMIZABLE GLASS WALL SYSTEM WITH PARTITIONED FILM

CROSS-REFERENCES

Technical Field

This invention relates generally to the field of building structures, and more specifically to glass walls.

BACKGROUND

Architects have long integrated transparent materials, such as glass, into building designs, whether using them for windows or walls, for a variety of reasons. Some reasons include that buildings that incorporate glass or other transparent materials in their exterior walls are visually appealing to outside viewers. Furthermore, they provide light, warmth, and an unobstructed view of surroundings to inside viewers. These features have driven construction designs to increasingly incorporate glass.

However, using glass, especially for exterior walls, has several drawbacks. First, glass has a lower insulation value than most other building materials used in exterior walls. Also, glass allows radiative energy to pass through it more easily than most other building materials.

For these reasons, a large variety of methods have been developed to improve the thermal resistance qualities of glass used in walls and windows. Some of these methods involve window coverings, which are able to be extended and retracted to cover or uncover the glass in an effort to achieve desired amounts of light and heat transfer. For example, Venetian blinds can be adjusted to allow varying amounts of light to pass through. Roller shades can be moved up and down to control how much light enters. Some inventions incorporate both Venetian blinds and roller shades to gain even more customization. Other methods use multiple layers of glass panes with air pockets in between. Still other methods utilize films that can be stuck to the window panes. These and other inventions provide only limited customization of heat and light passage through the glass.

In light of the foregoing, what is needed is a glass wall system that improves the thermal insulation properties of transparent building materials, but also improves the customization of light and heat passage by utilizing all of the above methods, and others, under the customized control of a user.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for a thermally insulative and highly customizable glass wall system.

Consistent with the foregoing, a system is disclosed. The system comprises a frame; at least two glazed, transparent panes mounted to the frame, defining an interior space within the frame; at least one upper roller mounted to an upper portion of the frame; at least one lower roller mounted to a lower portion of the frame; and at least one partitioned film attached to the at least one upper roller and the at least one lower roller. The film is attached to the rollers such that when the rollers are actuated, partitions of the film are selectively disposed within the interior space within the frame, juxtaposed behind the at least two glazed, transparent panes.

In a preferred embodiment, the system further comprises a removable headboard to which the at least one upper roller is mounted and a removable tailboard to which the at least one lower roller is mounted. Preferably, the at least two glazed, transparent panes comprise glass with low-E coating. In some embodiments, the at least two glazed, transparent panes comprise at least one double-pane or at least one triple-pane comprising a sealed gap between panes, and the sealed gap may contain a vacuum or a gas, such as argon or krypton. The at least one partitioned film comprises partitions comprising films that block visible light, films that block infrared radiation, films that block ultraviolet radiation, movie screen films, whiteboard films, decorative films, ballistic films, sound proofing films, or solar cell films in different embodiments. In a preferred embodiment, each partition comprises a length and width approximately equal to a length and width of the frame. Preferably, the frame is less than approximately five inches thick.

In preferred embodiments, the system comprises a controller that automatically actuates the at least one upper roller and the at least one lower roller. The rollers may be actuated automatically based on variables of time, weather, or amount of sunlight, or based on user preference input into a user interface. Some embodiments of the system comprise one or more window coverings, which may also be automated. In one embodiment, the one or more window coverings are also actuated automatically based on variables of time, weather, or amount of sunlight. In some embodiments, the system may comprise solar cells.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
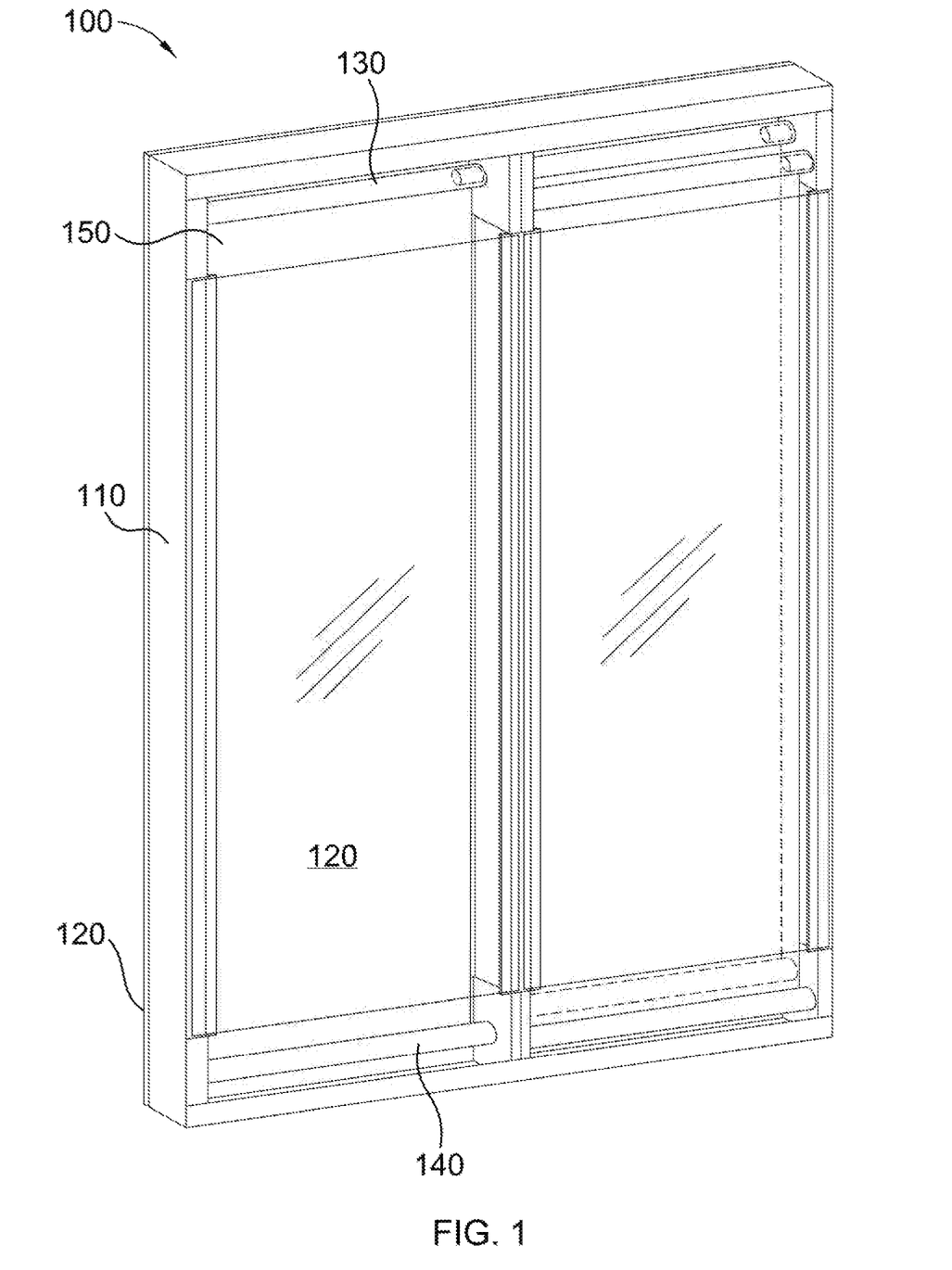
FIG. 1 depicts one embodiment of the invented system.

FIG. 1 depicts one embodiment of a system 100 comprising a frame 110; at least two glazed, transparent panes 120 mounted to the frame 110, defining an interior space within the frame 110; at least one upper roller 130 mounted to an upper portion of the frame 110; at least one lower roller 140 mounted to a lower portion of the frame 110; and at least one partitioned film 150 attached to the at least one upper roller 130 and the at least one lower roller 140 such that when the rollers 130 and 140 are actuated, partitions of the film 150 are selectively disposed within the interior space within the frame 110, juxtaposed behind the at least two glazed, transparent panes 120.

Figure 2:
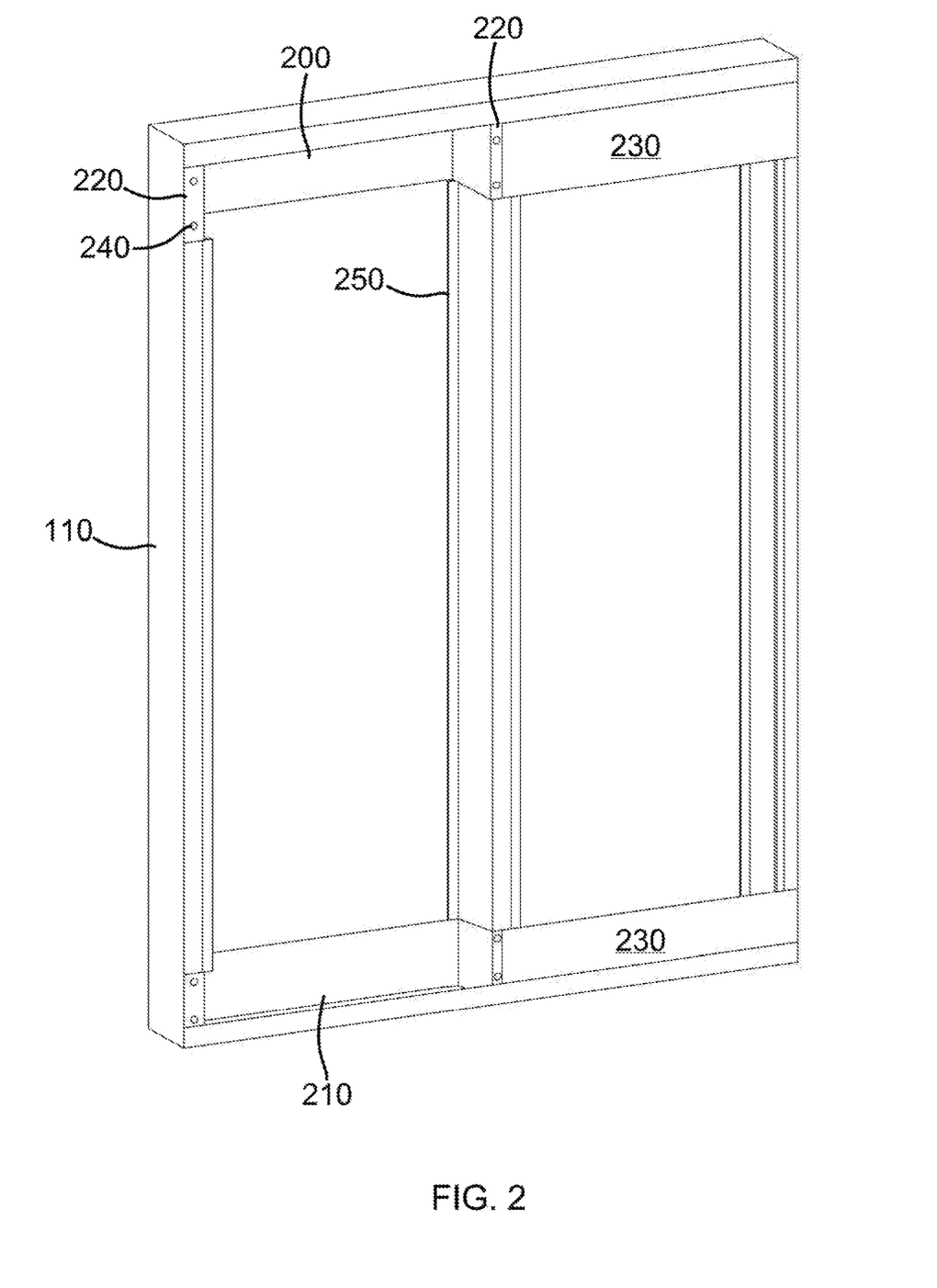
FIG. 2 depicts one embodiment of a frame.

FIG. 2 depicts one embodiment of a frame 110. The frame 110 may be a window frame or a wall frame. In a preferred embodiment, the frame 110 is in a rectangular configuration. In other embodiments, the frame 110 has other geometrical configurations. The frame 110 may be found in variable sizes. In a preferred embodiment, the frame 110 is less than approximately five inches thick, preferably approximately four and one-half inches thick, which is the standard thickness of a wall built with traditional materials. This allows the frame 110 to be integrated into a traditional building structure in the form of a wall or window. In a preferred embodiment, the frame 110 measures approximately four feet wide and fourteen feet high. In a preferred embodiment, the frame 110 comprises steel. In other embodiments, the frame 110 comprises other metal materials, wood, or engineered wood products. In a preferred embodiment, the frame 110 comprises a removable headboard 200 and a removable tailboard 210. A removable headboard 200 is attached to an upper portion of the frame 110. A removable tailboard 210 is attached to a lower portion of the frame 110. In other embodiments, the frame 110 may comprise only a removable headboard 200, only a removable tailboard 210, or neither. In a preferred embodiment, the removable headboard 200 and the removable tailboard 210 comprise thin sheets of steel. In a preferred embodiment, the removable headboard 200 and the removable tailboard 210 are less than approximately six inches tall and four feet long, positioned at the uppermost and lowermost edges of the frame 110. In a preferred embodiment, the removable headboard 200 and the removable tailboard 210 have an identical configuration. In a preferred embodiment, the configuration is that of an open-sided rectangle, shaped and sized to fit securely inside the frame 110, with two flanges 220 protruding from an open side. The two flanges 220 are used to mount the removable headboard 200 or the removable tailboard 210 to the frame 110. The removable headboard 200 and the removable tailboard 210 serve several functions. The removable headboard 200 and the removable tailboard 210 fill an aesthetic function, in that they block the at least one upper roller 130 and the at least one lower roller 140, as well as controllers, window coverings, or other items stored within the removable headboard 200 and the removable tailboard 210, from view when looking through from an outer side of the system 100. In a preferred embodiment, the frame 110 also comprises a removable cover 230 to block the items stored within the removable headboard 200 and the removable tailboard 210 from view when looking from the opposite inner side of the system 100. In a preferred embodiment, the removable headboard 200 and the removable tailboard 210 fill another important function, in that the at least one upper roller 130 and the at least one lower roller 140 are mounted to them. In a preferred embodiment, the at least one upper roller 130 is mounted to the removable headboard 200 and the at least one lower roller 140 is mounted to the removable tailboard 210. In one embodiment, one or more window coverings are also mounted to the removable headboard 200. Because the removable headboard 200 and the removable tailboard 210 are removable, in the event that any upper roller 130, lower roller 140, or window covering malfunctions, the removable headboard 200 and the removable tailboard 210 can be easily removed to a more convenient location so that the malfunctioning upper roller 130, lower roller 140, or window covering can be easily replaced. In one embodiment, the removable headboard 200 and the removable tailboard 210 are mounted to the frame 110 by means of connectors 240, such as screws, bolts, nails, or other connectors well known by those skilled in the art. The connectors 240 should be easy to remove. In one embodiment, the frame 110 comprises vertical tracks 250. The vertical tracks 250 are used to align the at least one partitioned film 150 that is attached to the at least one upper roller 130 and the at least one lower roller 140. An edge of the at least one partitioned film 150 can run along the vertical tracks 250 so that the at least one partitioned film 150 is secured in place. In embodiments comprising more than one partitioned film 150, there may be more than one set of vertical tracks 250, and separate sets of the vertical tracks 250 may be spaced, evenly or unevenly, along the frame 110 in order to space the partitioned films 150 within the interior space within the frame 110 and prevent the partitioned films 150 from touching.

Figure 3:
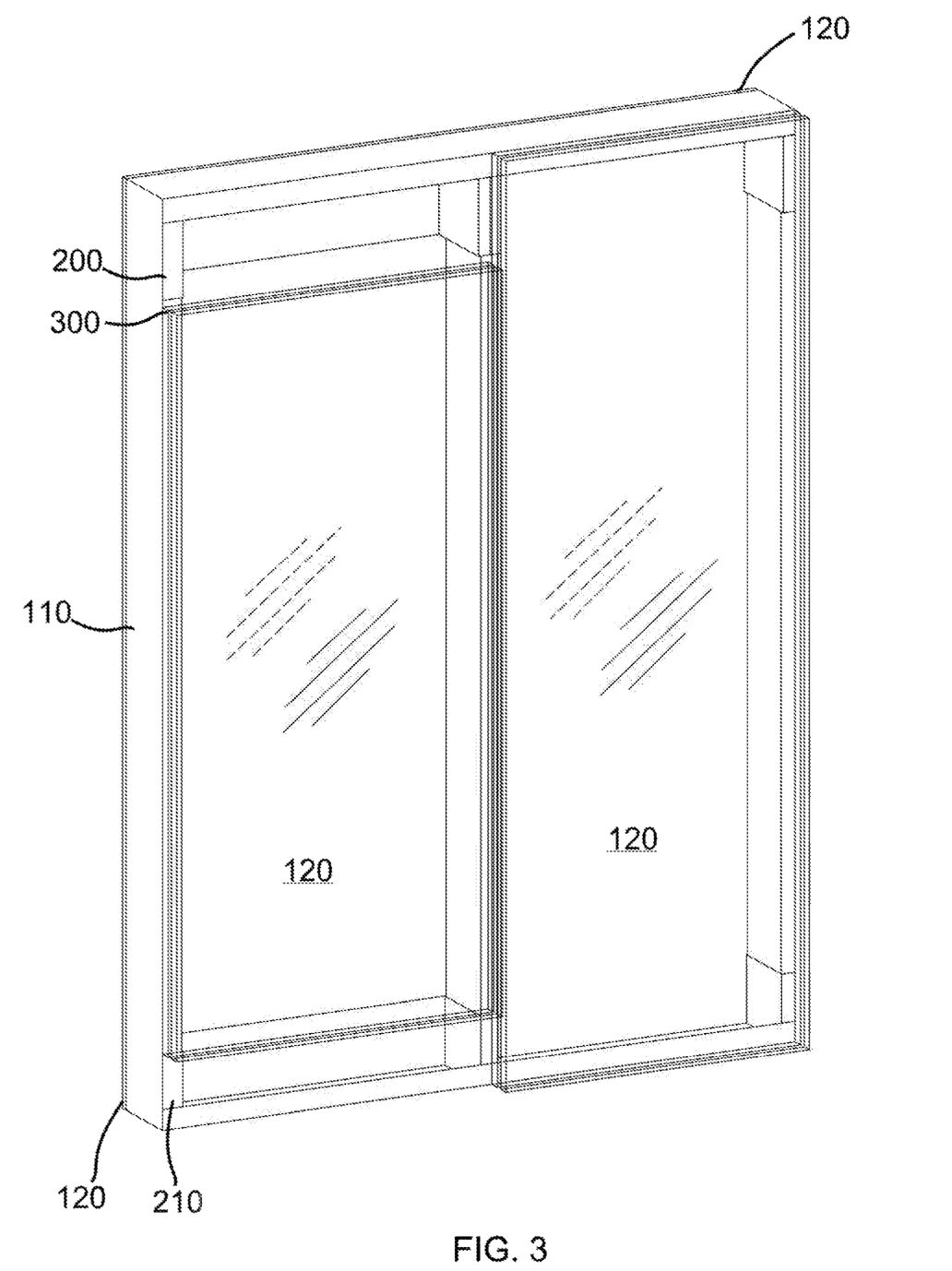
FIG. 3 depicts one embodiment of at least two glazed, transparent panes mounted to the frame, defining an interior space within the frame.

FIG. 3 depicts one embodiment of at least two glazed, transparent panes 120 mounted to the frame 110, defining an interior space within the frame 110. In a preferred embodiment, the at least two glazed, transparent panes 120 comprise glass. In other embodiments, the at least two glazed, transparent panes 120 comprise one of a variety of plastics, such as polycarbonates or acrylics. In a preferred embodiment, the at least two glazed, transparent panes 120 comprise low-E coating. Low-E coating minimizes the amount of infrared and ultraviolet radiation that can pass through the glazed, transparent panes 120. In other embodiments, the glazed, transparent panes 120 are glazed with water repellent, residue resistant, scratch resistant, or antistatic coatings. In one embodiment, the at least two glazed, transparent panes 120 comprise at least one double-pane or at least one triple-pane comprising a sealed gap 300 between panes of the double-pane or triple-pane. In a preferred embodiment, one glazed, transparent pane 120 that faces outside comprises a double-pane, and one glazed, transparent pane 120 that faces inside comprises a single pane. (This is opposite of the depiction in FIG. 3, in which a pane facing outside is a single pane, and a pane facing inside is a double pane, due to the difficulty of being able to appropriately label a view of the preferred embodiment.) In other embodiments, both inside-facing and outside-facing glazed, transparent panes 120 comprise double-panes or triple-panes. In one embodiment, the sealed gap 300 between panes of the double-panes or triple-panes comprises argon or krypton. In another embodiment, the sealed gap 300 comprises a vacuum. The at least two glazed, transparent panes 120 are mounted to the frame 110. In one embodiment, the glazed, transparent panes 120 are mounted to the frame 110 by means of resting on a protruding ledge and being attached with tape and glue. Other means of mounting commonly known in the art may be used. In a preferred embodiment, at least one glazed, transparent pane 120 is mounted to one side of the frame 110 facing outside, the at least one glazed, transparent pane 120 having a shape and size that extends over the entire outside-facing side of the frame 110, and at least one glazed, transparent pane 120 is mounted to an opposite side of the frame 110 facing inside, the at least one glazed, transparent pane 120 having a shape and size that extends nearly over the entire inside-facing side of the frame 110, but cutting off underneath the headboard 200 and above the tailboard 210. In another embodiment, at least one glazed, transparent pane 120 facing outside and at least one glazed, transparent pane 120 facing inside have a shape and size that extends over the entire inside and outside sides of the frame 110. This embodiment may not have a removable headboard 200 or a removable tailboard 210. The at least two glazed, transparent panes 120 mounted to the frame 110 define an interior space within the frame 110. In a preferred embodiment, the interior space within the frame 110 measures less than approximately five inches in depth. The interior space is used for disposing the at least one partitioned film 150 and any window coverings to vary the properties of the glazed, transparent panes 120. For example, some partitions of the at least one partitioned film 150 block the light or energy that passes through the glazed, transparent panes 120. Other partitions of the at least one partitioned film 150 vary the utility of the glazed, transparent panes 120.

Figure 4A:
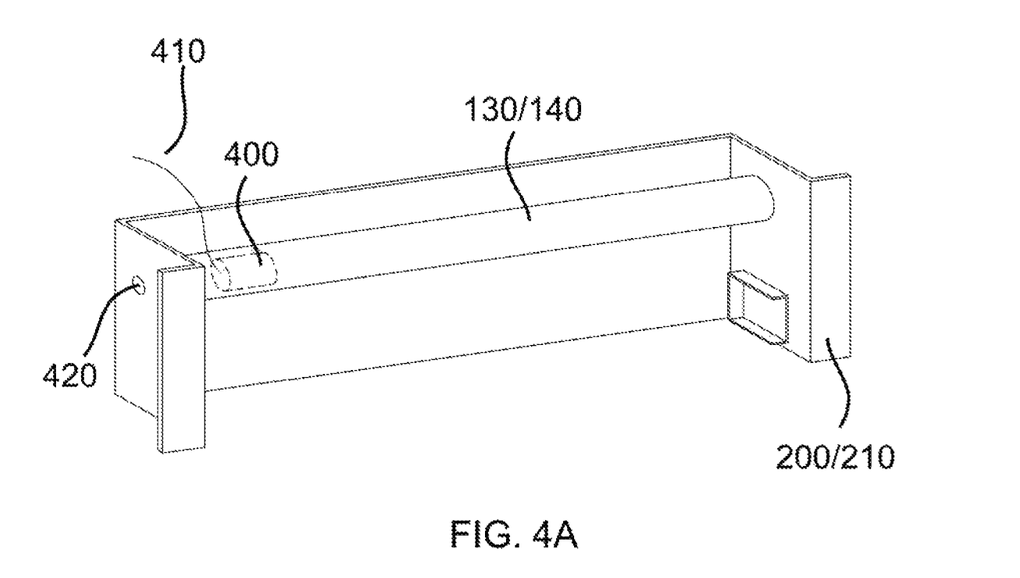
FIG. 4A depicts one embodiment of one upper roller mounted to a removable headboard or one lower roller mounted to a removable tailboard.
Figure 4B:
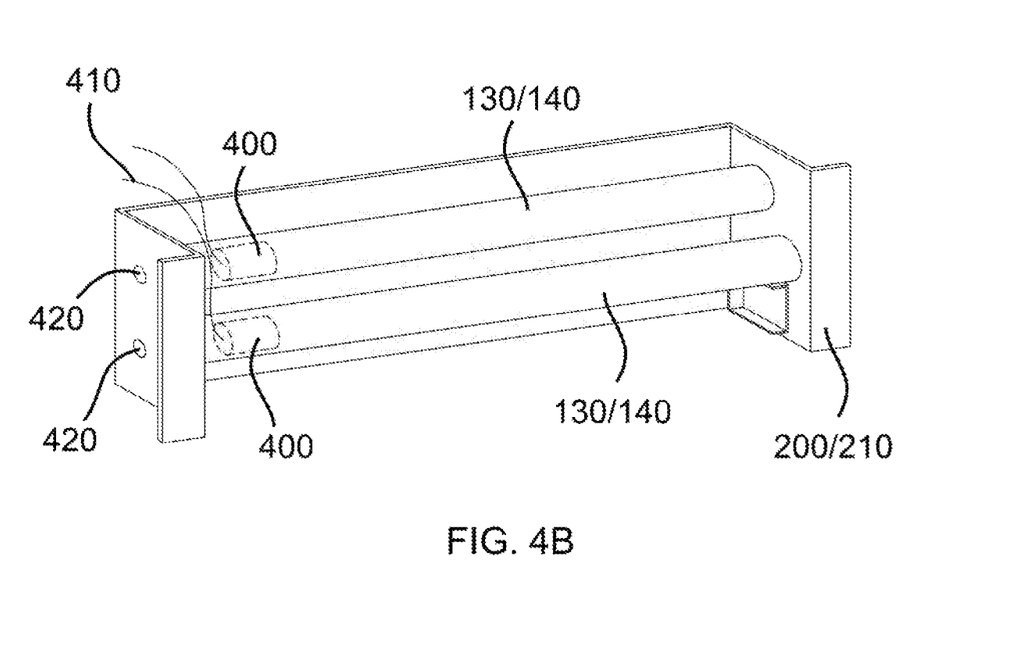
FIG. 4B depicts one embodiment of two upper rollers mounted to a removable headboard or two lower rollers mounted to a removable tailboard.

FIG. 4A and FIG. 4B depict one embodiment of at least one upper roller 130 mounted to the removable headboard 200 or at least one lower roller 140 mounted to the removable tailboard 210. Because the at least one upper roller 130 is mounted to an upper portion of the frame 110, and the at least one lower roller 140 is mounted to a lower portion of the frame 110, in a preferred embodiment the at least one upper roller 130 is mounted to the removable headboard 200, and the at least one lower roller 140 is mounted to the removable tailboard 210. In other embodiments, there is no removable headboard 200 or removable tailboard 210, and the at least one upper roller 130 and the at least one lower roller 140 are mounted directly to walls of the frame 110 at positions in an upper portion of the frame 110 or a lower portion of the frame 110 respectively. However, in a preferred embodiment, the rollers 130 and 140 are, as depicted in FIG. 4A and FIG. 4B, mounted to the removable headboard 200 and the removable tailboard 210, which are mounted to upper and lower portions of the frame 110. In a preferred embodiment, the at least one upper roller 130 and the at least one lower roller 140 have an identical configuration, as do the removable headboard 200 and the removable tailboard 210. Therefore, FIG. 4A and FIG. 4B depict both at least one upper roller 130 mounted to a removable headboard 200 or at least one lower roller 140 mounted to a removable tailboard 210. FIG. 4A depicts one upper roller 130 mounted to a removable headboard 200 or one lower roller 140 mounted to a removable tailboard 210, which are preferred embodiments. Other embodiments comprise more than one upper roller 130 mounted to the removable headboard 200 and more than one lower roller 140 mounted to the removable tailboard 210. FIG. 4B depicts two upper rollers 130 mounted to the removable headboard 200 or two lower rollers 140 mounted to the removable tailboard 210. In embodiments with more than one upper roller 130 or lower roller 140, each upper roller 130 or lower roller 140 is preferably attached to the removable headboard 200 or the removable tailboard 210 in an ascending or descending vertical pattern, each roller 130 or 140 stacked higher than the last and slightly offset to make room for each partitioned film 150. The system 100 has the potential of holding numerous upper rollers 130 and lower rollers 140. Numerous upper rollers 130 and lower rollers 140, however, may necessitate larger removable headboards 200, larger removable tailboards 210, and more vertical tracks 250. Furthermore, numerous upper rollers 130 and lower rollers 140 may complicate the system by making it difficult to contain all corresponding partitioned films 150. Therefore, preferably, the system 100 comprises only one, two, or a few upper rollers 130 and lower rollers 140. Preferably, the system 100 comprises the same number of upper rollers 130 and lower rollers 140. At least one partitioned film 150 is attached to the at least one upper roller 130 and the at least one lower roller 140. Preferably, one partitioned film 150 is attached to one upper roller 130 and one lower roller 140.

In a preferred embodiment, the at least one upper roller 130 and the at least one lower roller 140 extend the width of the removable headboard 200 or the removable tailboard 210. The removable headboard 200 and the removable tailboard 210 extend the width of the frame 110. The at least one upper roller 130 and the at least one lower roller 140 are mounted to the removable headboard 200 or the removable tailboard 210 by means of connectors 420 attached through the two ends of the at least one upper roller 130 or the at least one lower roller 140. The connectors 420 can be removed in order to remove the at least one upper roller 130 or the at least one lower roller 140 when necessary. Because the removable headboard 200 and the removable tailboard 210 are removable, in the event that an upper roller 130 or a lower roller 140 malfunctions, the removable headboard 200 and the removable tailboard 210 can be easily removed to a more convenient location so that the malfunctioning upper roller 130 or lower roller 140 can be easily replaced. In a preferred embodiment, the at least one upper roller 130 and the at least one lower roller 140 comprise plastic. In other embodiments, the at least one upper roller 130 and the at least one lower roller 140 comprise metal, fiberglass, wood, or other non-pliable materials. In a preferred embodiment, the at least one upper roller 130 and the at least one lower roller 140 are hollow. In a preferred embodiment, the at least one upper roller 130 and the at least one lower roller 140 comprise motors 400. In a preferred embodiment, each upper roller 130 and each lower roller comprises one motor 400, though only upper rollers 130 or only lower rollers 140 have motors 400 in other embodiments. In a preferred embodiment, one motor 400 is placed within the hollow space inside each upper roller 130 and each lower roller 140. When the motor 400 is actuated, the motor 400 rotates, causing the upper roller 130 or the lower roller 400 to rotate with it. In a preferred embodiment, the motors 400 within the at least one upper roller 130 and the at least one lower roller 140 are synchronized. In a preferred embodiment, each motor 400 is connected to a central controller. The central controller automates the at least one upper roller 130 and the at least one lower roller 140, whether by preprogramming or user input. The motors 400 are powered by battery or solar cells in some embodiments. In other embodiments, the motors 400 are connected to electrical power. In one embodiment, wires 410 run through the frame 110 to connect the motors 400 to electrical power.

Figure 5A:
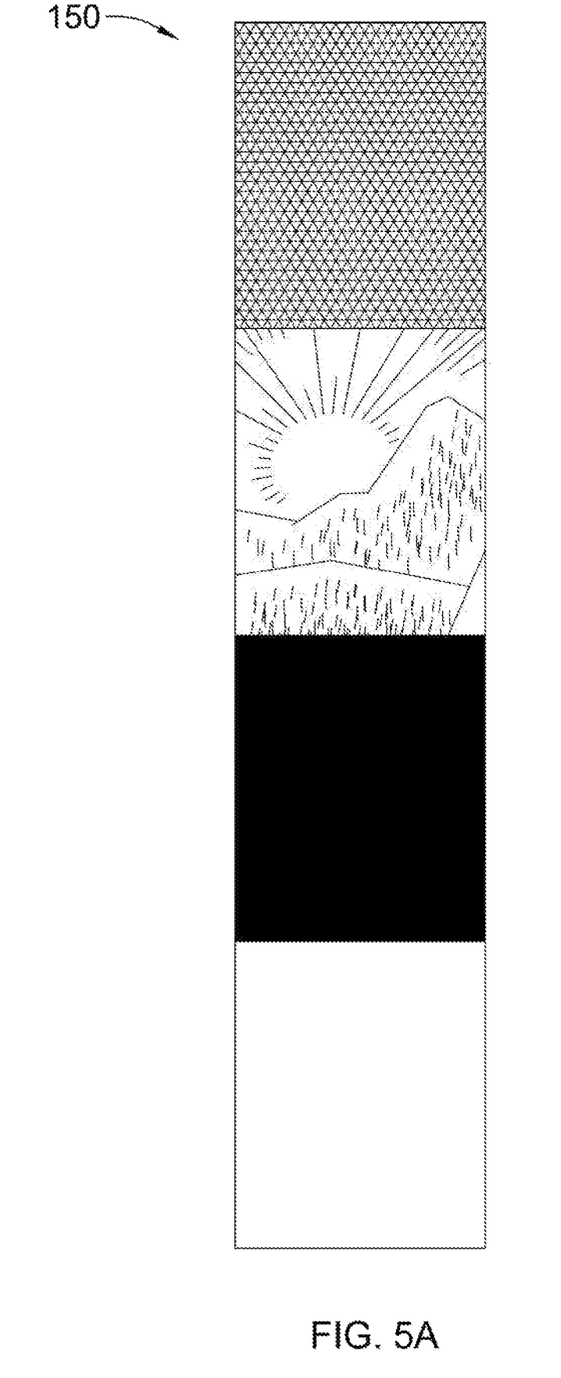
FIG. 5A depicts one embodiment of a partitioned film.

FIG. 5A depicts one embodiment of a partitioned film 150. A film is a thin sheet of a given material. A partitioned film is a thin sheet of two or more given materials, the sheet divided into sections, or partitions, according to material, yet constituting one continuous sheet. At least one partitioned film 150 is attached to the at least one upper roller 130 and the at least one lower roller 140. Preferably, the number of upper rollers 130 and lower rollers 140 in the system 100 is equal to the number of partitioned films 150. In a preferred embodiment, exactly one partitioned film 150 is attached to one upper roller 130 and one lower roller 140. The system 100 has the capacity to hold more upper rollers 130, lower rollers 140, and films 150 when it is desirable to utilize two or more types of film at once. However, numerous upper rollers 130 and lower rollers 140 may necessitate larger removable headboards 200, larger removable tailboards 210, and more vertical tracks 250. Furthermore, it may be difficult to contain numerous rollers 130 and 140 and partitioned films 150 within the system 100. Therefore, preferably, the system 100 comprises only one, two, or perhaps a few upper rollers 130, lower rollers 140, and partitioned films 150. In one embodiment, the at least one partitioned film 150 comprises partitions selected from a group consisting of films that block visible light, films that block infrared radiation, and films that block ultraviolet radiation. For example, one partition of film is a blackout screen that blocks all visible light. Another partition of film particularly blocks short wave-length radiation. Another partition of film has an electrical current that allows a user to vary the percentage of visible light that can penetrate the film. In one embodiment, the at least one partitioned film 150 comprises partitions selected from a group consisting of movie screens, whiteboard films, decorative films, ballistic films, or sound proofing films. For example, one partition of film has a scenic view. Another partition of film has a party backdrop. In another embodiment, the partitioned film 150 comprises partitions of flexible steel sheets with solar cells. In a preferred embodiment, each partition comprises a length and width approximately equal to a length and width of the frame 110. In a preferred embodiment, the at least one partitioned film 150 is flexible such that it can be rolled down into the interior space within the frame 110, and around the at least one upper roller 130 and the at least one lower roller 140.

Figure 5B:
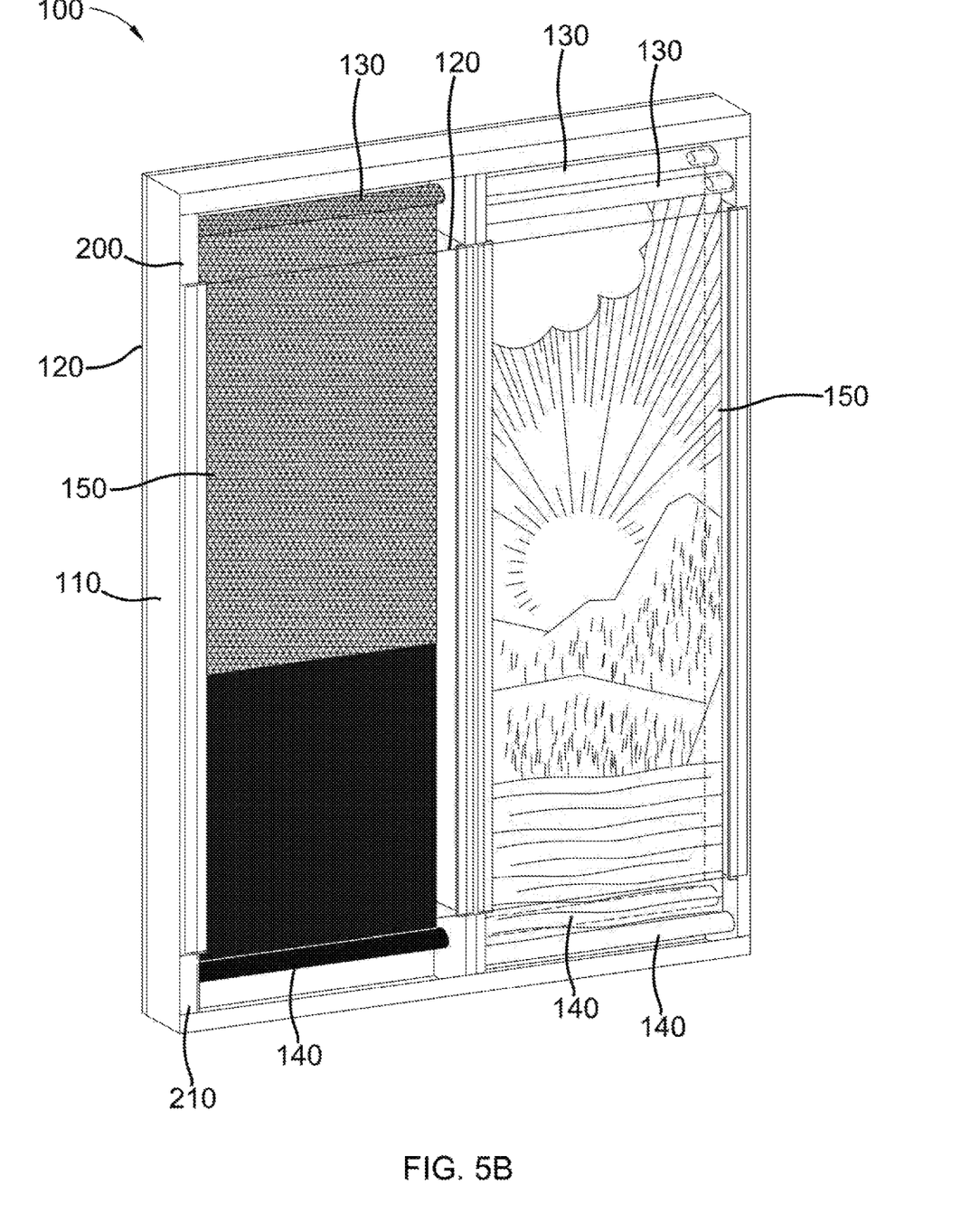
FIG. 5B depicts one embodiment of at least one partitioned film attached to the at least one upper roller and the at least one lower roller such that when the rollers are actuated, partitions of the film are selectively disposed within the interior space within the frame, juxtaposed behind the at least two glazed, transparent panes.

FIG. 5B depicts one embodiment of at least one partitioned film 150 attached to the at least one upper roller 130 and the at least one lower roller 140 such that when the rollers 130 and 140 are actuated, partitions of the film 150 are selectively disposed within the interior space within the frame 110, juxtaposed behind the at least two glazed, transparent panes 120. A preferred embodiment comprises one partitioned film 150 attached to one upper roller 130 and one lower roller 140. Another embodiment includes two partitioned films 150, each attached to one upper roller 130 and one lower roller 140. Other embodiments comprise more than two partitioned films 150, upper rollers 130, and lower rollers 140. Preferably, the number of upper rollers 130 and lower rollers 140 in the system 100 is equal to the number of partitioned films 150, each partitioned film 150 paired with and attached to one upper roller 130 and one lower roller 140. The at least one upper roller 130 is mounted to an upper portion of the frame 110, preferably to the removable headboard 200. The at least one lower roller 140 is mounted to a lower portion of the frame 110, preferably to the removable tailboard 210. When the at least one upper roller 130 and the at least one lower roller 140 attached to the at least one partitioned film 150 are actuated, preferably by synchronously actuating the motors 400 inside each upper roller 130 and lower roller 140, the at least one partitioned film 150 rotates with the at least one upper roller 130 and the at least one lower roller 140, such that partitions of the at least one film 150 are disposed within the interior space within the frame 100, passing through in sequence, juxtaposed behind the at least two glazed, transparent panes 120, until a selected partition of film 150 is exposed. In a preferred embodiment, a selected partition of the film 150 comprises a length and width approximately equal to a length and width of the frame 110, such that a selected partition of film 150 can fill the entire frame 110 at one time. The selected partition of the film 150 to be disposed within the interior space within the frame 110 at any given time may be controlled by user preference or automation. In one embodiment, the automation is based on variables of time, weather, or amount of sunlight. For example, the system 100 may be programmed so that during summer days, one partition of the film 150 that blocks infrared radiation may be disposed within the interior space within the frame 110, to keep heat out. During summer nights, one partition of the film 150 that blacks visible light may be disposed within the interior space within the frame 110. In embodiments that have two or more partitioned films 150, two or more partitions of film 150 can be disposed within the interior space within the frame 110 at once. For example, during a winter night, a partition of one film 150 that is a blackout screen and a partition of another film 150 that blocks short-wave infrared radiation can be simultaneously disposed within the interior space within the frame 110.

Figure 6:
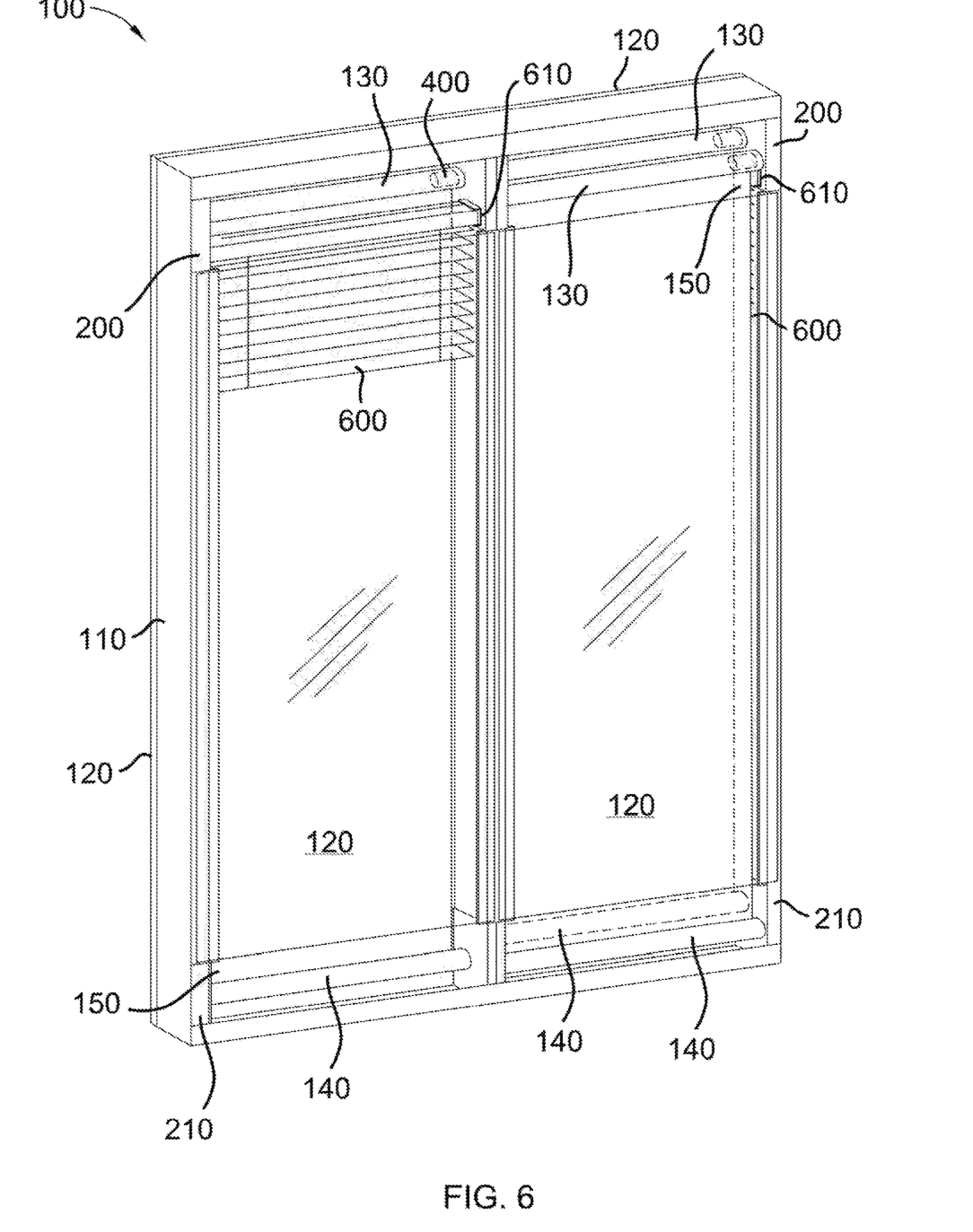
FIG. 6 depicts one embodiment of the system comprising one or more window coverings.

FIG. 6 depicts one embodiment of the system 100 comprising one or more window coverings 600. In a preferred embodiment, the system 100 comprises one or more window coverings 600 mounted to the removable headboard 200 such that the one or more window coverings 600 are disposable within the interior space within the frame 110. In another embodiment in which there is no removable headboard 200, the one or more window coverings 600 are mounted to walls of the frame 110 such that the one or more window coverings 600 are disposable within the interior space within the frame 110. In different embodiments, the one or more window coverings 600 comprise blinds, shades, or shutters. In other embodiments, the one or more window coverings comprise curtains or drapes. In a preferred embodiment, the one or more window coverings 600 comprise cellular shades. In a preferred embodiment, the one or more window coverings 600 are automated. The one or more window coverings 600 may be premanufactured for automation, be retrofit with an automating gearbox, or be automated by means of a central controller. They may be powered by battery, solar cells or electrical wiring. In one embodiment, the one or more window coverings 600 are actuated automatically based on variables of time, weather, or amount of sunlight. The one or more window coverings 600 can be opened or closed, or slats can be tilted varying determined degrees, according to a programmed schedule or according to spontaneous events. In one embodiment, the one or more window coverings 600 are automated based on user preferences communicated through user inputs. In one embodiment, a user interface allows a user to give user inputs. In different embodiments, the user interface comprises voice control, buttons, switches, or a touch-sensitive display on a mobile device. In one embodiment, the one or more window coverings 600 extend a length of the removable headboard 200 and are mounted to the removable headboard 200 by means of mounting brackets 610 that are mounted to the removable headboard 200 at opposite sides of the removable headboard 200 by means of connectors. In one embodiment, the mounting brackets 610 are mounted below the at least one upper roller 130. In other embodiments, the mounting brackets 610 are mounted between or above the at least one upper roller 130. Because the removable headboard 200 is removable, in the event that the one or more window coverings 600 malfunction, the removable headboard 200 can be easily removed to a more convenient location so that the malfunctioning one or more of the window coverings 600 can be easily replaced. In a preferred embodiment, when the one or more window coverings 600 are disposed within the interior space within the frame 110, the one or more window coverings 600 completely fill a length and width of the frame 110. The one or more window coverings 600 are juxtaposed behind the at least two glazed, transparent panes 120. In embodiments comprising more than one window covering 600, the window coverings 600 may be selectively actuated, such that just one window covering 600 is disposed within the interior space within the frame 110 at one time, or groups of two or more differing combinations of window coverings 600 are disposed within the interior space within the frame 110 at one time. In a preferred embodiment, the one or more window coverings 600 are disposed in front of the at least one partitioned film 150 toward an inside-facing side. In embodiments with more than one partitioned film 150, the one or more window coverings 600 may be disposed behind the partitioned films 150, or in between the partitioned films 150.

Figure 7:
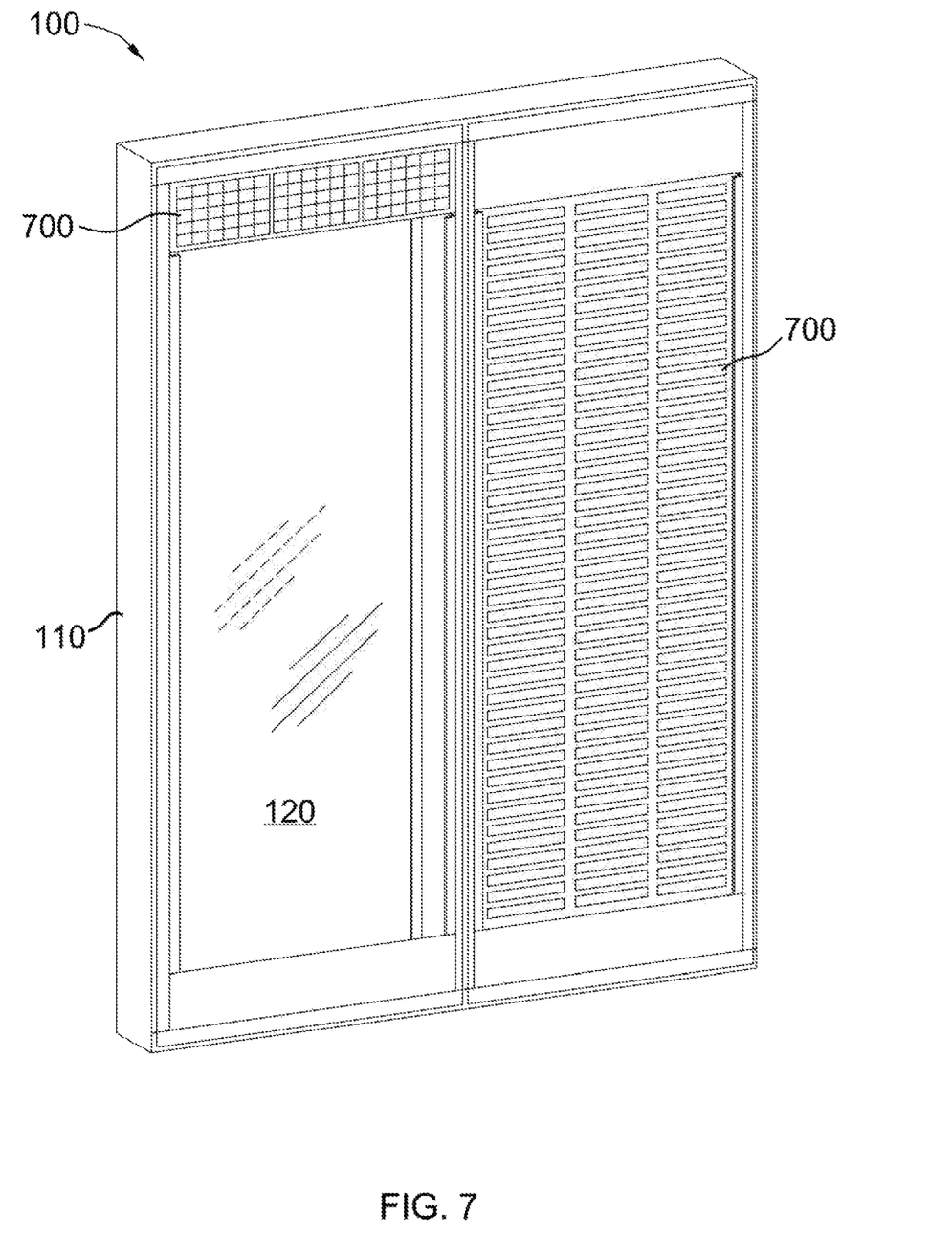
FIG. 7 depicts one embodiment of the system comprising solar cells.

FIG. 7 depicts one embodiment of the system 100 comprising solar cells 700. In one embodiment, the solar cells 700 are solar panels mounted to the frame 110. In a preferred embodiment, the solar cells 700 are mounted to an outside of the frame 110. In one embodiment, the solar cells 700 are mounted over a top portion of one glazed, transparent pane 120, covering the visible portion of the removable headboard 200 that can be seen through the glazed, transparent pane 120. In another embodiment, one partition of the at least one partitioned film 150 comprises solar cells. The partition is a flexible steel sheets with solar cells 700 embedded therein. In embodiments of the system 100 that include solar cells 700, the energy generated from the solar cells 700 can be used to power the system 100. In one embodiment, the system 100 includes a controller that automates the system 100. The solar cells 700 can be connected to the controller such that the energy generated by the solar cells 700 powers the controller, which automates the system 100.

Figure 8:
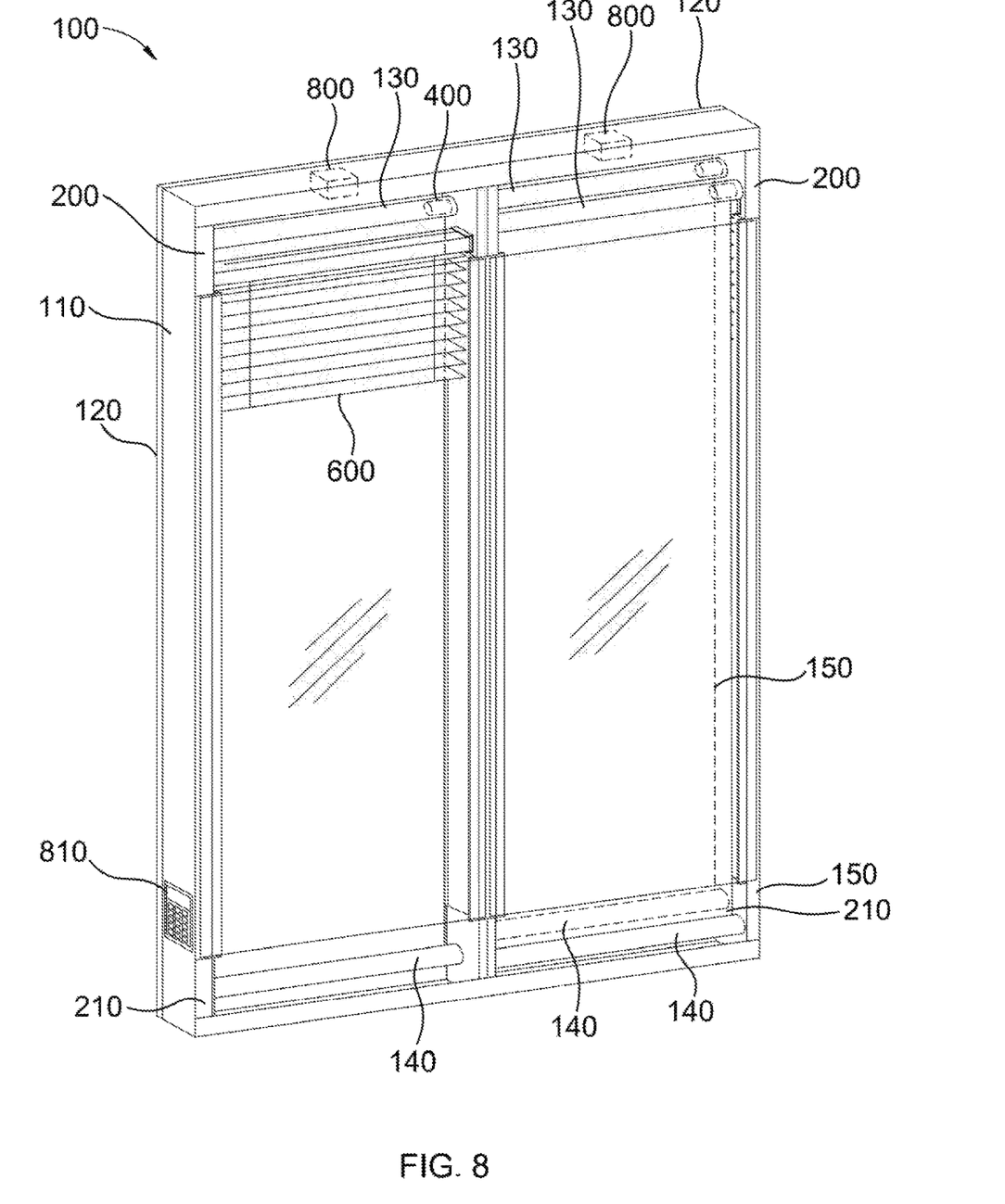
FIG. 8 depicts one embodiment of the system comprising a controller.

FIG. 8 depicts one embodiment of the system 100 comprising a controller 800. In a preferred embodiment, the system 100 comprises a controller 800 that automatically actuates the at least one upper roller 130 and the at least one lower roller 140. In one embodiment, the at least one upper roller 130 and the at least one lower roller 140 are actuated automatically based on variables of time, weather, or amount of sunlight. In another embodiment, the at least one upper roller 130 and the at least one lower roller 140 are actuated automatically based on user preference input into a user interface 810. In different embodiments, the user interface comprises voice control, buttons, switches, or a touch-sensitive display on a mobile device. In a preferred embodiment, the controller 800 also automates the one or more window coverings 600. In one embodiment, the one or more window coverings 600 are also actuated automatically based on variables of time, weather, or amount of sunlight. In another embodiment, the one or more window coverings 600 are actuated automatically based on user preference input into the user interface 810. In different embodiments, the controller 800 is powered by battery, solar cells, or electrical wiring.

A preferred embodiment of the system 100 comprises one window covering 600, one upper roller 130, one lower roller 140, and one partitioned film 150 attached to the upper roller 130 and the lower roller 140. The window covering 600 is mounted such that it is disposed within the interior space within the frame 110 in front of the partitioned film 150 on the inside-facing side. Partitions of the film 150 and the window covering 600 are selectively actuated automatically according to programmed time, sunlight, and weather patterns in the controller 800. For example, during a winter night, the window covering 600 and a partition of the film 150 that blocks short-wave infrared radiation are automatically disposed within the interior space within the frame 110 to keep heat in. However, during a winter day, the window covering 600 is automatically rolled up and a partition of the film 150 with a decorative element is automatically disposed within the interior space within the frame 110 in order to let light and radiation in. While watching a movie during the day, the window covering 600 and a partition of the film 150 that acts as a blackout screen can be automatically disposed within the interior space within the frame 110. During a summer night, the window covering 600 and a partition of the film 150 that blocks short-wave infrared radiation are automatically disposed within the interior space within the frame 110 to keep heat out. However, during a summer day, the partition of the film 150 that blocks short-wave infrared radiation stays to keep heat out, but the window covering 600 is rolled up to let light in. The controller 800 is programmed to recognize and implement each of these and other scenarios automatically. In still other embodiments, the controller 800 can be programmed to implement decorative film partitions at given holidays, ballistic film partitions when building occupants are absent, or movie screen film partitions when electronic devices are turned on, among other things. The controller 800 can also be programmed to receive user inputs through the user interface 810. Some embodiments may comprise more than one partitioned film 150, which would increase the versatility and the options of window covering and film partition combinations that can be disposed within the interior space within the frame 110 at any given time. In each scenario, the controller 800 can be programmed to automatically implement the varying combinations of partitions of the at least one film 150 and one or more window coverings 600.

The invention claimed is:

1. A system comprising:
   a frame comprising a removable headboard and a removable tailboard, each of which fit securely inside the frame and comprise flanges which mount to the frame protruding from an open side of the frame;
   at least two panes mounted to the frame, defining an interior space within the frame;
   an upper roller mounted to the removable headboard, wherein the upper roller comprises a motor for rotating the upper roller and wherein the motor is within a hollow space inside the upper roller;
   a lower roller mounted to the removable tailboard, wherein the lower roller comprises a motor for rotating the lower roller and wherein the motor is within a hollow space inside the lower roller; and
   a partitioned film that is attached to and rolls around the upper roller and the lower roller, such that when the upper roller and lower roller are actuated, partitions of the film are selectively disposed within the interior space within the frame, between the at least two panes.

2. The system of claim 1, wherein the frame comprises vertical tracks to guide the partitioned film.

3. The system of claim 1, further comprising one or more removable covers that block contents of the removable headboard or removable tailboard from view.

4. The system of claim 1, wherein the at least two panes comprise at least one double-pane or at least one triple-pane comprising a sealed gap between panes of the at least one double-pane or the at least one triple pane.

5. The system of claim 4, wherein the sealed gap comprises argon or krypton.

6. The system of claim 4, wherein the sealed gap comprises a vacuum.

7. The system of claim 1, wherein the at least two panes comprise glass.

8. The system of claim 1, wherein the at least two panes comprise low-E coating.

9. The system of claim 1, wherein the frame is less than approximately five inches thick.

10. The system of claim 1, wherein the partitioned film comprises partitions selected from a group consisting of films that block visible light, films that block infrared radiation, and films that block ultraviolet radiation.

11. The system of claim 1, wherein the partitioned film comprises partitions selected from a group consisting of movie screens, whiteboard films, decorative films, ballistic films, or sound proofing films.

12. The system of claim 1, wherein each partition comprises a length and width approximately equal to a length and width of the frame and can be positioned to fill the entire frame at one time.

13. The system of claim 1, further comprising a controller that automatically actuates the upper roller and the lower roller.

14. The system of claim 13, wherein the upper roller and the lower roller are actuated automatically based on variables of time, weather, or amount of sunlight.

15. The system of claim 13, wherein the upper roller and the lower roller are actuated automatically based on user preference input into a user interface.

16. The system of claim 1, further comprising a separably operable window covering mounted to the removable headboard alongside the upper roller, such that when the window covering is actuated, it can move up and down within the interior space within the frame, between the at least two panes.

17. The system of claim 16, wherein the window covering comprises blinds, shades, adjustable slats, or shutters.

18. The system of claim 16, wherein the window covering is automated.

19. The system of claim 18, wherein the window covering is actuated automatically based on variables of time, weather, or amount of sunlight.

20. The system of claim 1, further comprising solar cells.

* * * * *